US009033561B2

(12) United States Patent
Tokieda et al.

(10) Patent No.: US 9,033,561 B2
(45) Date of Patent: May 19, 2015

(54) VEHICLE LIGHTING UNIT

(71) Applicant: Stanley Electric Co., Ltd., Tokyo (JP)

(72) Inventors: Yuki Tokieda, Tokyo (JP); Toshiyuki Okuno, Tokyo (JP); Hirokuni Osugi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 75 days.

(21) Appl. No.: 13/902,777

(22) Filed: May 24, 2013

(65) Prior Publication Data

US 2013/0314935 A1 Nov. 28, 2013

(30) Foreign Application Priority Data

May 24, 2012 (JP) .................. 2012-118161

(51) Int. Cl.
*F21V 5/00* (2006.01)
*F21V 8/00* (2006.01)
*B60Q 1/00* (2006.01)
*F21S 8/10* (2006.01)

(52) U.S. Cl.
CPC .............. *G02B 6/0001* (2013.01); *G02B 6/001* (2013.01); *G02B 6/0038* (2013.01); *G02B 6/008* (2013.01); *B60Q 1/0035* (2013.01); *B60Q 1/0041* (2013.01); *B60Q 1/0047* (2013.01); *F21S 48/2212* (2013.01); *F21S 48/2237* (2013.01); *F21S 48/2262* (2013.01); *F21S 48/2268* (2013.01); *F21S 48/2287* (2013.01)

(58) Field of Classification Search
USPC .................... 362/23.09, 23.16, 223–225, 237, 362/606–613, 615–617, 620, 621, 625, 626, 362/628; 349/56–58, 61, 62, 65, 67
See application file for complete search history.

(56) References Cited

U.S. PATENT DOCUMENTS

| | | | |
|---|---|---|---|
| 6,530,683 B1 | 3/2003 | Ohkohdo et al. | |
| 8,092,064 B2 * | 1/2012 | Erchak et al. | 362/613 |
| 8,113,704 B2 * | 2/2012 | Bae et al. | 362/613 |
| 8,154,689 B2 * | 4/2012 | Ajichi et al. | 349/65 |
| 8,243,231 B2 * | 8/2012 | Hur et al. | 349/65 |
| 8,277,104 B2 * | 10/2012 | Jeong et al. | 362/601 |
| 8,421,955 B2 * | 4/2013 | Kubota et al. | 349/62 |
| 8,674,929 B2 * | 3/2014 | Seo et al. | 345/102 |
| 2001/0053072 A1 * | 12/2001 | Takemoto | 362/31 |
| 2004/0183962 A1 * | 9/2004 | Hua-Nan et al. | 349/64 |
| 2008/0101068 A1 * | 5/2008 | Kitamura et al. | 362/246 |
| 2013/0044509 A1 * | 2/2013 | Chung et al. | 362/602 |

FOREIGN PATENT DOCUMENTS

| | | |
|---|---|---|
| JP | 5-25602 U | 4/1993 |
| JP | 2001-60405 A | 3/2001 |

* cited by examiner

*Primary Examiner* — Hargobind S Sawhney
(74) *Attorney, Agent, or Firm* — Kenealy Vaidya LLP

(57) ABSTRACT

A vehicle lighting unit can include LEDs and at least two long light guide bodies arranged adjacent to each other. At least two light transmitting lenses can be disposed in front of the at least two light guide bodies. The at least two light guide bodies each can include a gap portion interposed therebetween. A first end portion of the light transmitting lens can be positioned at the gap portion so that the first end portions of the light transmitting lenses overlap with each other in a front-rear direction. The first end portions of the at least two light transmitting lenses can have a surface processed portion on its front surface. The surface processed portions can be configured to direct light exiting through the respective first end portions of the at least two light guide bodies forward.

12 Claims, 4 Drawing Sheets

Fig. 2
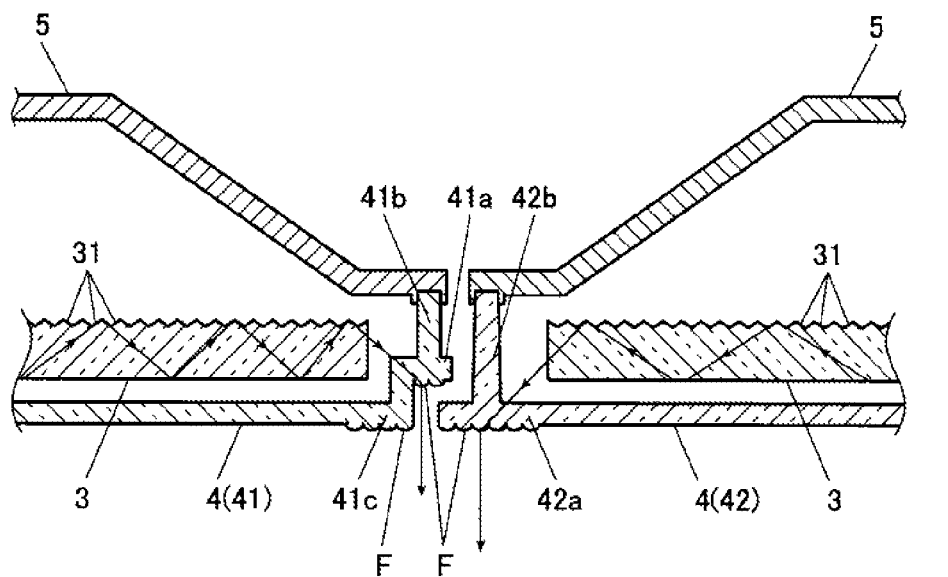
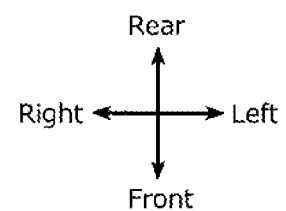

Fig. 3
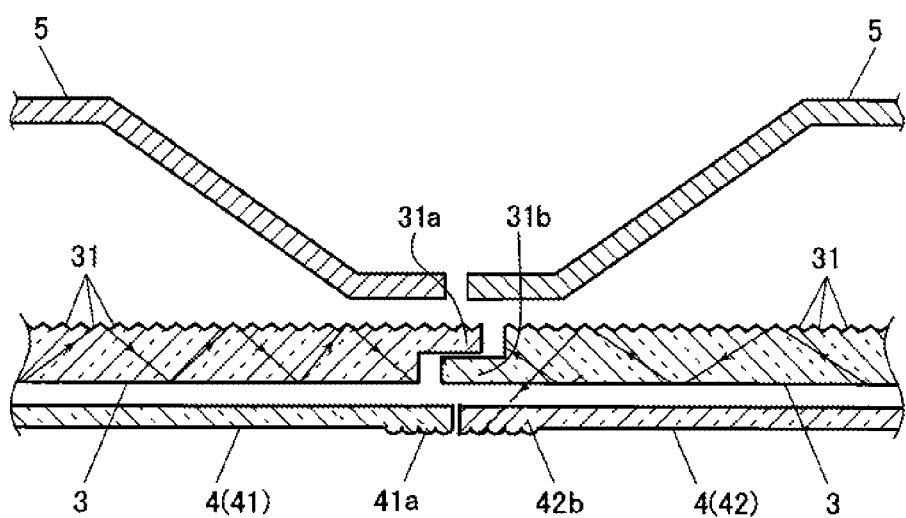
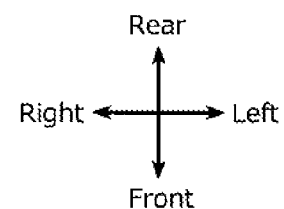

Fig. 4
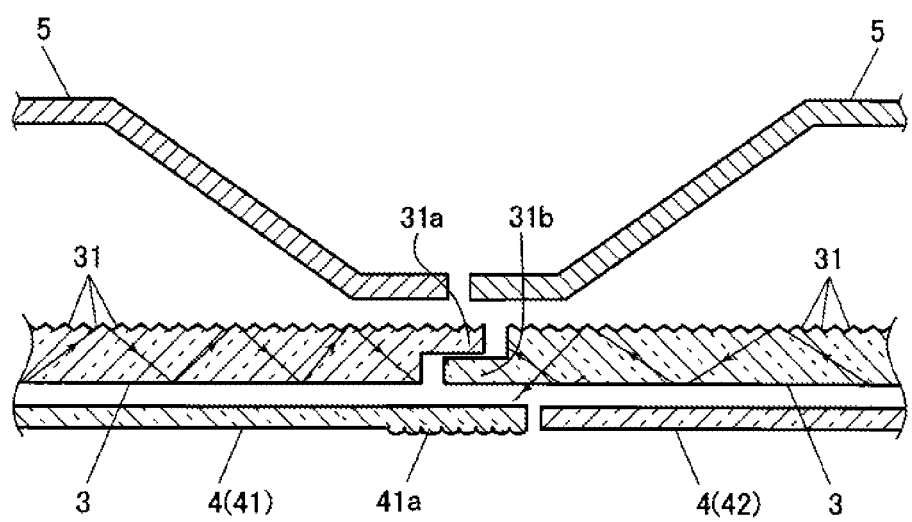
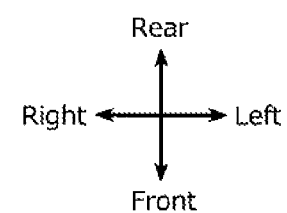

VEHICLE LIGHTING UNIT

This application claims the priority benefit under 35 U.S.C. §119 of Japanese Patent Application No. 2012-118161 filed on May 24, 2012, which is hereby incorporated in its entirety by reference.

TECHNICAL FIELD

The presently disclosed subject matter relates to a vehicle lighting unit.

BACKGROUND ART

Conventionally known vehicle lighting units to be installed in vehicle bodies can include an elongated light guide body through which light can be guided for emission, thereby illuminating the entire light guide body.

Due to the problems in manufacturing or assembling, this type of vehicle lighting unit has a limitation on the length and shape of a single light guide body. If the light-emitting portion is configured to have a certain length or to have a complex shape, a plurality of light guide bodies are arranged so that respective ends are disposed in proximity to each other as if they are connected together while the light guide bodies are separately controlled for light emission. (See, for example, Japanese Patent Application Laid-Open No. 2001-60405 (or U.S. Pat. No. 6,530,683B1 corresponding thereto) and Japanese Utility Model Application Laid-Open No. Hei. 5-25602.)

However, if a plurality of light guide bodies are arranged in proximity to each other and separately controlled for light emission, the gap portion between the adjacent light guide bodies cannot be illuminated with light. Therefore, the light emission state as a whole may be observed not in an integrated fashion but in a skipped fashion with the not-lit gap portion, resulting in deteriorated appearance.

SUMMARY

The presently disclosed subject matter was devised in view of these and other problems and features in association with the conventional art. According to an aspect of the presently disclosed subject matter, a vehicle lighting unit having at least adjacent light guide bodies can emit light with the gap portion between the adjacent light guide bodies being lit.

Specifically, according to another aspect of the presently disclosed subject matter, a vehicle lighting unit can include: a light source; at least two long light guide bodies arranged adjacent to each other, the light guide bodies capable of guiding light from the light source to output the light for illumination; and at least two light transmitting lenses disposed in front of the at least two light guide bodies to cover the light guide bodies, respectively, wherein: the at least two light guide bodies each include a first end portion in a longitudinal direction, the first end portions facing to each other with a gap portion interposed therebetween; and the at least two light transmitting lenses each include a first end portion positioned at the gap portion between the light guide bodies so that the first end portions of the light transmitting lenses overlap with each other in a front-rear direction; and the first end portions of the at least two light transmitting lenses each have a surface processed portion on its front surface, the surface processed portions configured to direct light exiting through the respective first end portions of the at least two light guide bodies forward.

According to principles of the presently disclosed subject matter, the respective first end portions of the two light transmitting lenses covering the respective long light guide bodies can be formed to overlap with each other in the front-rear direction at the gap portion formed between the first end portions of the two adjacent light guide bodies. Furthermore, those first end portions of the two light transmitting lenses can each have a front surface provided with the surface processed portion, which is configured to direct light exiting from the respective first end portions of the adjacent light guide bodies forward. With this configuration, the light guided through the light guide bodies and exiting from the respective first end portions of the light guide bodies positioned at the gap portion can be incident on the two light transmitting lenses positioned at the gap portion and pass through the surface processed portions of the first end portions of the light transmitting lenses to be directed forward. Thus, the first end portions of the two light transmitting lenses can light the gap portion between the adjacent two light guide bodies when viewed from its front side.

In the vehicle lighting unit with the above configuration, the first end portion of one of the at least two light transmitting lenses can include a rear step so that the first end portion of the one of the at least two light transmitting lenses is stepped rearward, and the first end portion of the other of the at least two light transmitting lenses can include an extension covering the gap portion and extending to a position in front of the rear step of the first end portion of the one of the at least two light transmitting lenses.

With this configuration, the gap portion formed between the at least two light guide bodies can be covered with the illuminating part formed by the first end portions of the at least two light transmitting lenses reliably, whereby the first end portions of the two light transmitting lenses can light the gap portion between the adjacent two light guide bodies.

In the vehicle lighting unit with the above configuration, the surface processed portion can be formed by subjecting the first end portion of each of the at least two light guide bodies to cut or surface texturing.

The surface processed portion can be formed to have a plurality of cut portions or knurled portions or the like, so that the light guided by and exiting from the at least two light guide bodies can be surely directed forward and diffused, whereby the gap portion formed between the two light guide bodies can be reliably obscured.

In the vehicle lighting unit with the above configuration, the light source can include a first light source device for one of the at least two light guide bodies, and a second light source device for the other of the at least two light guide bodies. Each of the at least two light guide bodies can have a second end portion opposite to the first end portion in the longitudinal direction, and the first light source device can be disposed to face to the second end portion of the one of the at least two light guide bodies so that light emitted from the first light source device is incident on the second end portion of the one of the at least two light guide bodies and guided through the one of the at least two light guide bodies, thereby illuminating the entire light guide body. Furthermore, the second light source device can be disposed to face to the second end portion of the other of the at least two light guide bodies so that light emitted from the second light source device is incident on the second end portion of the other of the at least two light guide bodies, thereby illuminating the entire light guide body. In this configuration, the surface processed portions of the first end portions of the at least two light transmitting lenses can direct forward the light guided by the at least two light guide bodies and exiting through the respective first end portions of the at least two light guide bodies for light emission while diffusing the light, whereby the vehicle lighting unit can be illuminated with light as a whole.

According to still another aspect of the presently disclosed subject matter, a vehicle lighting unit can include: a light source; and at least two long light guide bodies arranged adjacent to each other, the light guide bodies capable of guiding light from the light source to output the light for illumination, the at least two light guide bodies each include a first end portion in a longitudinal direction, the first end portions each having a thinned portion arranged to overlap with each other in an alternate manner in a front-rear direction so that gap portions formed between the first end portions in the front-rear direction can overlap with any of the thinned portions of the first end portions to be obscured by the thinned portions of the first end portions. With this configuration, the entire light guide bodies can be lit as if they are an integral part without gap portions when viewed from its front side.

The vehicle lighting unit with the above configuration can further include at least two light transmitting lenses disposed in front of the at least two light guide bodies to cover the light guide bodies, respectively, the at least two light transmitting lenses each including a first end portion positioned at the first end portions of the at least two light guide bodies so that the first end portions of the light transmitting lenses overlap with any of the gap portions formed between the first end portions in the front-rear direction, any of the first end portions of the at least two light transmitting lenses having a surface processed portion formed on its front surface, the surface processed portion configured to direct light exiting through the respective first end portions of the at least two light guide bodies forward.

In the vehicle lighting unit with the above configuration, the first end portion of one of the light transmitting lenses can cover both the gap portions formed between the first end portions of the at least two light guide bodies, and the first end portion covering both the gap portions has the surface processed portion and the first end portion of the other of the light transmitting lenses does not have a surface processed portion.

BRIEF DESCRIPTION OF DRAWINGS

These and other characteristics, features, and advantages of the presently disclosed subject matter will become clear from the following description with reference to the accompanying drawings, wherein:

FIG. 2 is a cross-sectional view illustrating the vehicle lighting unit taken along line III-III of FIG. 1;

FIG. 3 is a cross-sectional view illustrating the vehicle lighting unit according to another exemplary embodiment taken along line III-III of FIG. 1; and FIG. 4 is a cross-sectional view illustrating a modification the vehicle lighting unit of FIG. 3.

DESCRIPTION OF EXEMPLARY EMBODIMENTS

Figure 1:
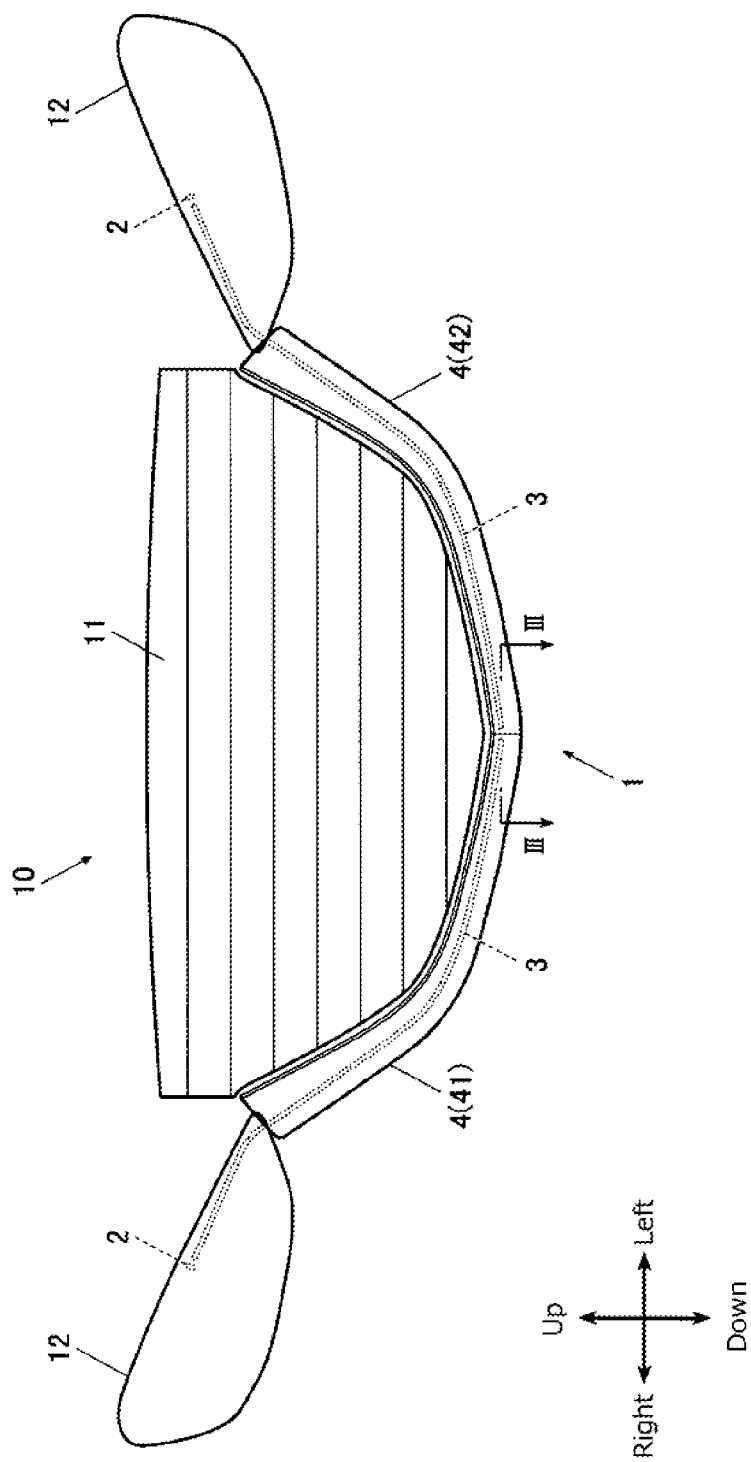
FIG. 1 is a front view illustrating essential parts of a vehicle body provided with a vehicle lighting unit made in accordance with principles of the presently disclosed subject matter.

A description will now be made below to a vehicle lighting unit of the presently disclosed subject matter with reference to the accompanying drawings in accordance with exemplary embodiments.

FIG. 1 is a front view illustrating essential parts of a vehicle body 10 provided with a vehicle lighting unit 1 made in accordance with the principles of the presently disclosed subject matter. FIG. 2 is a cross-sectional view illustrating part of the vehicle lighting unit 1 taken along line III-III of FIG. 1.

Note that in the present description, the directions of "front," "back," "left," "right," "up," and "down (low)" mean the directions when viewed with respect to the vehicle lighting unit 1 installed in the vehicle body 10.

As shown in FIG. 1, the vehicle lighting unit 1 can be an accessory lamp for illuminating the lower edge portion of a front grill 11 of the vehicle body 10. The vehicle lighting unit 1 can include two light sources such as light-emitting diodes (LEDs) 2, two long light guide bodies 3, and two light transmitting lenses 4. Namely, the vehicle lighting unit 1 can be composed of two lamp units each including the LED 2, the light guide body 3 and the light transmitting lens 4. The two lamp units can be arranged side by side in a symmetric manner except for parts of the respective light transmitting lenses 4, which will be described later.

In this configuration, the two LEDs 2 can be disposed within respective headlamps 12 disposed either side of the front grill 11 to serve as the light source of the vehicle lighting unit 1. More specifically, as shown in FIG. 1, each of the LEDs 2 can be disposed at about a widthwise center of the headlamp 12 on the upper edge thereof with the light emission surface thereof facing to the widthwise center of the vehicle body 10.

The two light guide bodies 3 can be configured to extend from the upper edge of the center of the right or left headlamp 12 to the lower portion of the front grill 11 at the center of the vehicle body 10, so that first end portions of the two light guide bodies 3 in the longitudinal direction can face to each other at the center of the vehicle body 10 while second end portions of the light guide bodies 3 can face to the LEDs 2 within the respective headlamps 12, respectively. As shown in FIG. 2, each of the light guide bodies 3 can have a plurality of lens cuts 31 with a cross section of saw-tooth shape arranged along the longitudinal direction of the light guide body 3 and on a rear surface thereof. Each of the light guide body 3 can guide the light that is emitted from the LED 2 facing to the second end portion of the light guide body 3 and incident on the second end portion of the light guide body 3, along the longitudinal direction of the light guide body 3 while being reflected forward by the plurality of lens cuts 31. As a result, the light can exit over the entire length of the light guide body 3 in the forward direction, thereby illuminating the entire light guide body 3 arranged along the lower edge of the front grill 11. Note that a single light guide body in the shape corresponding to the combination of these two light guide bodies 3 has had problems in production and assembly aspects, and accordingly, these two light guide bodies 3 as separate members should be adopted instead of the adoption of such a single light guide body.

The two light transmitting lenses 4 each can have a shape extending along the lower edge of the front grill 11 from the center-side end portion of the headlamp 12 to the lower portion of the center of the front grill 11. The vehicle lighting unit 1 can further include two housings 5 opened forward as shown in FIG. 2 and be disposed in a manner similar to the two light transmitting lenses 4, so that the respective light transmitting lenses 4 can cover the openings of the housings 5. Each of the housings 5 can accommodate almost the entire length of each of the two light guide bodies 3 except for the portion of the light guide body 3 present within the headlamp 12. Accordingly, each of the two light transmitting lenses 4 can cover almost the entire length of each of the two light guide bodies 3. Note that a single light transmitting lens in the shape corresponding to the combination of these two light transmitting lenses 4 has had problems in production and assembly aspects as in the light guide body, and accordingly, these two light transmitting lenses 4 as separate members should be adopted instead of the adoption of such a single light transmitting lens.

As shown in FIG. 2, each of the two light transmitting lenses 4 can have a first end portion placed in the vicinity of the center of the vehicle body 10. Specifically, a gap portion is formed between the first end portions of the two light guide bodies 3 facing to each other, and the first end portions of the light transmitting lenses 4 can be positioned at the gap portion so that they overlap with each other in the front-rear direction. In this context, the "gap portion formed between the first end portions of the two light guide bodies 3" means not only to the portion strictly defined between the first end portions of the two light guide bodies 3 facing to each other but also means to include the area in front of the portion strictly defined between the first end portions.

Specifically, the first end portion of the light transmitting lens 41, or one of the two light transmitting lenses 4 on the right side of the vehicle body, can be formed to have a front step 41c positioned in the foremost position of the gap portion, a rear step 41a configured to be stepped rearward and a side wall 41b extending from the rear step 41a in the rearward direction. On the other hand, the first end portion of the light transmitting lens 42, or one of the two light transmitting lenses 4 on the left side of the vehicle body, can be formed to have an extension 42a covering the gap between these light transmitting lenses 41 and 42 and extending to the position in front of the rear step 41a, and a side wall 42b extending from the extension 42a in the rearward direction.

Each of the first end portions of the two light transmitting lenses 4 (41, 42) can have a front surface with a surface processed portion F formed thereon. The front processed portion F can be designed such that the light exiting through the first end portions of the light guide bodies 2 can be directed forward for light emission. Specifically, the rear step 41a and the front step 41c of the right light transmitting lens 41 and the extension 42a of the left light transmitting lens 42, which are disposed at or within the gap portion formed between the first end portions of the two light guide bodies 3, can function as the surface processed portion F. The surface processed portion F can be formed by subjecting that portion to cut or surface texturing, so that the light that has been emitted from the LEDs 2, guided through the two light guide bodies 3, and exited through the respective first end portions of the light guide bodies 3 toward the center of the vehicle body 10 can be directed forward for light emission while being diffused.

According to the vehicle lighting unit 1 with the above configuration, the respective first end portions of the two light transmitting lenses 4 covering the respective long light guide bodies 3 can be formed to overlap with each other in the front-rear direction at the gap portion formed between the first end portions of the two light guide bodies 3. Furthermore, those first end portions of the light transmitting lenses 4 can each have the front surface provided with the surface processed portion(s) F configured to direct light exiting from the respective first end portions of the light guide bodies 3. With this configuration, the light guided through the light guide bodies 3 and exiting from the respective first end portions of the light guide bodies 3 positioned at the gap portion can be incident on the two light transmitting lenses 4 positioned at the gap portion and pass through the surface processed portions F of the first end portions of the light transmitting lenses 4 to be directed forward. Thus, the first end portions of the two light transmitting lenses 4 can light the gap portion between the adjacent two light guide bodies 3 when viewed from its front side.

With this configuration, the entire light guide bodies 3 can be lit as if they are an integral part without a gap portion when viewed from its front side because the light can be emerged between the two lamp units where the gap portion is formed between the two light guide bodies 3. Therefore, the appearance of the entire vehicle lighting unit during light emission can be improved.

Furthermore, the surface processed portion F can be formed by subjecting that portion to cut or surface texturing, so that the light that has passed through the surface processed portion F can be diffused. As a result, when viewed from its front side, the gap portion formed between the two light guide bodies 3 (between the light transmitting lenses 4) can be obscured, so that the two light guide bodies 3 can be observed as if they are an integral part emitting light.

FIG. 3 is a cross-sectional view illustrating the vehicle lighting unit according to another exemplary embodiment taken along line III-III of FIG. 1.

In the present exemplary embodiment, the first end portions of the two adjacent long light guide bodies 3 and the corresponding first end portions of the light transmitting lenses 4 are formed to be different from those of the previous exemplary embodiment of FIG. 2. Specifically, as shown in FIG. 3 or 4, the first end portions 31a and 31b of the two adjacent long light guide bodies 3 can each have a thinned portion arranged to overlap with each other in an alternate manner in the front-rear direction. In this configuration, the major gap portion formed as in FIG. 2 can disappear while two miner gap portions in the front-rear direction are formed between the thinned first end portions 31a and 31b. However, in the present exemplary embodiment, the two miner gap portions formed between the two adjacent light guide bodies 3 can be obscured by the respective thinned first end portions 31a and 31b.

In this configuration, the rear side minor gap portion between the first end portions 31a and 31b can be covered with the thinned first end portion 31b while the front side minor gap portion between the first end portions 31a and 31b can be obscured by the rear-side thinned first end portion 31a. These thinned portions can be lit with the guided light within the light guide bodies 3, and therefore the minor gap portions can be obscured.

In this case, the light transmitting lenses 41 do not have to have a specific configuration, but can have respective first end portions 41a and 42b as extensions over the first end portions 31a and 31b of the two light guide bodies 3. Although the minor gap portions can be obscured by the thinned first end portions 31a and 31b of the light guide bodies 3, the surfaces of the respective first end portions 41a and 42b may have respective surface processed portions F, whereby the obscure configuration as in the previous exemplary embodiment can be ensured.

Alternatively, as a modification as shown in FIG. 4, one (41) of the light transmitting lenses 4 can only include the extension as the first end portion 41a which can cover the entire minor gap portions formed between the thinned first end portions 31a and 31b of the light guide bodies 3 and can have a surface processed portion. In this case, the end of the other light transmitting lens 42 does not have to have a surface processed portion because it does not overlap with the gap portions.

With this configuration, the same advantageous effects as in the previous exemplary embodiment can be achieved. In addition, there is no specific design and forming process for the other light transmitting lens 42 without a surface processed portion, and therefore, the production cost and the like for the light transmitting lenses 4 can be reduced.

The other features and configuration of the present exemplary embodiment are the same as or similar to those of the previous exemplary embodiment, and thus, the description thereof will be omitted here. As described, the problems associated with the conventional art can be solved by the specific configuration focusing on the structure of the light-transmitting lenses in the previous exemplary embodiment while they can be solved by the specific configuration focusing on the structure of the light guide bodies in the present exemplary embodiment. What is important is to obscure the gap portion(s) formed between the two adjacent light guide bodies by the specific configuration of the light guide bodies themselves and/or the two adjacent light transmitting lenses covering the light guide bodies.

In the present embodiment, the vehicle lighting unit 1 has been described to include two lamp units each including the light source 2, the light guide body 3, the light transmitting lens 4, and the housing 5, with the two lamp units being adjacent to each other. However, the presently disclosed subject matter can be applied to a vehicle lighting unit having three or more sets of constituent components where there is formed at least one gap portion between two adjacent light guide bodies and the obscuring structure is provided by the two adjacent light transmitting lenses.

In the present embodiment, the vehicle lighting unit 1 made in accordance with the principles of the presently disclosed subject matter has been exemplified as an accessory lamp for decorating purpose. However, it is not limitative and the presently disclosed subject matter can be applied to various vehicle lighting units other than an accessory lamp.

The light guide body 3 has been described as a long light guide body in a stick shape, but is not limited thereto. The shape of the long light guide body can be a long plate.

The light source for the vehicle lighting unit 1 has been described as an LED, but not limited thereto. Examples of the light sources, aside from the light-emitting diode, may include laser diodes, and common bulbs.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
   a light source;
   at least two long light guide bodies arranged adjacent to each other, the light guide bodies configured to guide light from the light source to output the light for illumination; and
   at least two light transmitting lenses disposed in front of the at least two light guide bodies to cover the light guide bodies, respectively, wherein:
   the at least two light guide bodies each include a first end portion in a longitudinal direction, the first end portions facing to each other with a gap portion interposed therebetween; and
   the at least two light transmitting lenses each include a first end portion positioned at the gap portion between the at least two light guide bodies so that the first end portions of the light transmitting lenses overlap with each other in a front-rear direction, and the first end portions of the at least two light transmitting lenses each have a surface processed portion on a front surface, each of the surface processed portions configured to direct light exiting through the respective first end portions of the at least two light guide bodies forward.

2. The vehicle lighting unit according to claim 1, wherein the first end portion of one of the at least two light transmitting lenses includes a rear step so that the first end portion of the one of the at least two light transmitting lenses is stepped rearward, and the first end portion of the other of the at least two light transmitting lenses includes an extension covering the gap portion and extending to a position in front of the rear step of the first end portion of the one of the at least two light transmitting lenses.

3. The vehicle lighting unit according to claim 2, wherein the surface processed portion is formed by subjecting the first end portion of each of the at least two light guide bodies to cut or surface texturing.

4. The vehicle lighting unit according to claim 3, wherein the light source includes a first light source device for one of the at least two light guide bodies, and a second light source device for an other of the at least two light guide bodies;
   each of the at least two light guide bodies has a second end portion opposite to the first end portion in the longitudinal direction;
   the first light source device is disposed to face to the second end portion of the one of the at least two light guide bodies so that light emitted from the first light source device is incident on the second end portion of the one of the at least two light guide bodies and guided through the one of the at least two light guide bodies, thereby illuminating the entire light guide body;
   the second light source device is disposed to face to the second end portion of the other of the at least two light guide bodies so that light emitted from the second light source device is incident on the second end portion of the other of the at least two light guide bodies, thereby illuminating the entire light guide body; and
   the surface processed portions of the first end portions of the at least two light transmitting lenses are configured to direct forward the light guided by the at least two light guide bodies and exiting through the respective first end portions of the at least two light guide bodies for light emission while diffusing the light, whereby the vehicle lighting unit can be illuminated with light as a whole.

5. The vehicle lighting unit according to claim 2, wherein the light source includes a first light source device for one of the at least two light guide bodies, and a second light source device for an other of the at least two light guide bodies;
   each of the at least two light guide bodies has a second end portion opposite to the first end portion in the longitudinal direction;
   the first light source device is disposed to face to the second end portion of the one of the at least two light guide bodies so that light emitted from the first light source device is incident on the second end portion of the one of the at least two light guide bodies and guided through the one of the at least two light guide bodies, thereby illuminating the entire light guide body;
   the second light source device is disposed to face to the second end portion of the other of the at least two light guide bodies so that light emitted from the second light source device is incident on the second end portion of the other of the at least two light guide bodies, thereby illuminating the entire light guide body; and the surface processed portions of the first end portions of the at least two light transmitting lenses are configured to direct forward the light guided by the at least two light guide bodies and exiting through the respective first end portions of the at least two light guide bodies for light emission while diffusing the light, whereby the vehicle lighting unit can be illuminated with light as a whole.

6. The vehicle lighting unit according to claim 1, wherein the surface processed portion is formed by subjecting the first end portion of each of the at least two light guide bodies to cut or surface texturing.

7. The vehicle lighting unit according to claim 6, wherein the light source includes a first light source device for one of the at least two light guide bodies, and a second light source device for an other of the at least two light guide bodies;
   each of the at least two light guide bodies has a second end portion opposite to the first end portion in the longitudinal direction;
   the first light source device is disposed to face to the second end portion of the one of the at least two light guide bodies so that light emitted from the first light source device is incident on the second end portion of the one of the at least two light guide bodies and guided through the one of the at least two light guide bodies, thereby illuminating the entire light guide body;
   the second light source device is disposed to face to the second end portion of the other of the at least two light guide bodies so that light emitted from the second light source device is incident on the second end portion of the other of the at least two light guide bodies, thereby illuminating the entire light guide body; and
   the surface processed portions of the first end portions of the at least two light transmitting lenses are configured to direct forward the light guided by the at least two light guide bodies and exiting through the respective first end portions of the at least two light guide bodies for light emission while diffusing the light, whereby the vehicle lighting unit can be illuminated with light as a whole.

8. The vehicle lighting unit according to claim 1, wherein the light source includes a first light source device for one of the at least two light guide bodies, and a second light source device for an other of the at least two light guide bodies;
   each of the at least two light guide bodies has a second end portion opposite to the first end portion in the longitudinal direction;
   the first light source device is disposed to face to the second end portion of the one of the at least two light guide bodies so that light emitted from the first light source device is incident on the second end portion of the one of the at least two light guide bodies and guided through the one of the at least two light guide bodies, thereby illuminating the entire light guide body;
   the second light source device is disposed to face to the second end portion of an other of the at least two light guide bodies so that light emitted from the second light source device is incident on the second end portion of the other of the at least two light guide bodies, thereby illuminating the entire light guide body; and
   the surface processed portions of the first end portions of the at least two light transmitting lenses are configured to direct forward the light guided by the at least two light guide bodies and exiting through the respective first end portions of the at least two light guide bodies for light emission while diffusing the light, whereby the vehicle lighting unit can be illuminated with light as a whole.

9. A vehicle lighting unit comprising:
   a light source;
   at least two long light guide bodies arranged adjacent to each other, the light guide bodies configured to guide light from the light source to output the light for illumination, the at least two light guide bodies each include a first end portion in a longitudinal direction, the first end portions each having a thinned portion arranged to overlap with each other in an alternate manner in a front-rear direction so that gap portions formed between the first end portions in the front-rear direction overlap with at least one of the thinned portions of the first end portions to be obscured by the thinned portions of the first end portions while the at least two light guide bodies are lit as if they are a single integral part when viewed from its front side; and
   at least two light transmitting lenses disposed in front of the at least two light guide bodies to cover the light guide bodies, respectively, the at least two light transmitting lenses each including a first end portion positioned at the first end portions of the at least two light guide bodies so that the first end portions of the light transmitting lenses overlap with at least one of the gap portions formed between the first end portions in the front-rear direction, at least one of the first end portions of the at least two light transmitting lenses having a surface processed portion formed on a front surface, the surface processed portion configured to direct light exiting through respective first end portions of the at least two light guide bodies forward.

10. The vehicle lighting unit according to claim 9, wherein the first end portion of one of the light transmitting lenses covers both gap portions formed between the first end portions of the at least two light guide bodies, and the first end portion covering both gap portions has the surface processed portion and the first end portion of the other of the light transmitting lenses does not have a surface processed portion.

11. The vehicle lighting unit according to claim 10, wherein the surface processed portion is formed by subjecting the first end portion of each of the at least two light guide bodies to cut or surface texturing.

12. The vehicle lighting unit according to claim 9, wherein the surface processed portion is formed by subjecting the first end portion of each of the at least two light guide bodies to cut or surface texturing.

* * * * *